L. N. BRUNER.
APPARATUS FOR USE IN THE MANUFACTURE OF GLASS BOTTLES AND THE LIKE.
APPLICATION FILED SEPT. 6, 1913.
1,229,028.
Patented June 5, 1917.
4 SHEETS—SHEET 1.
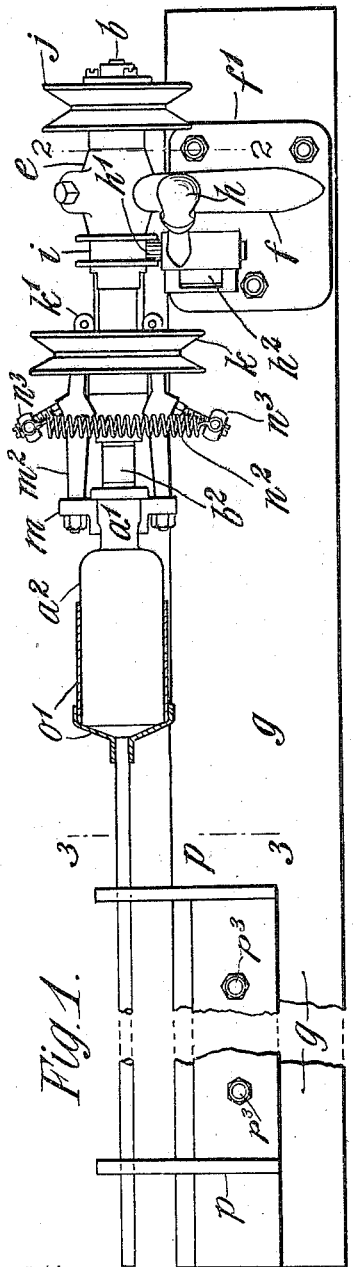
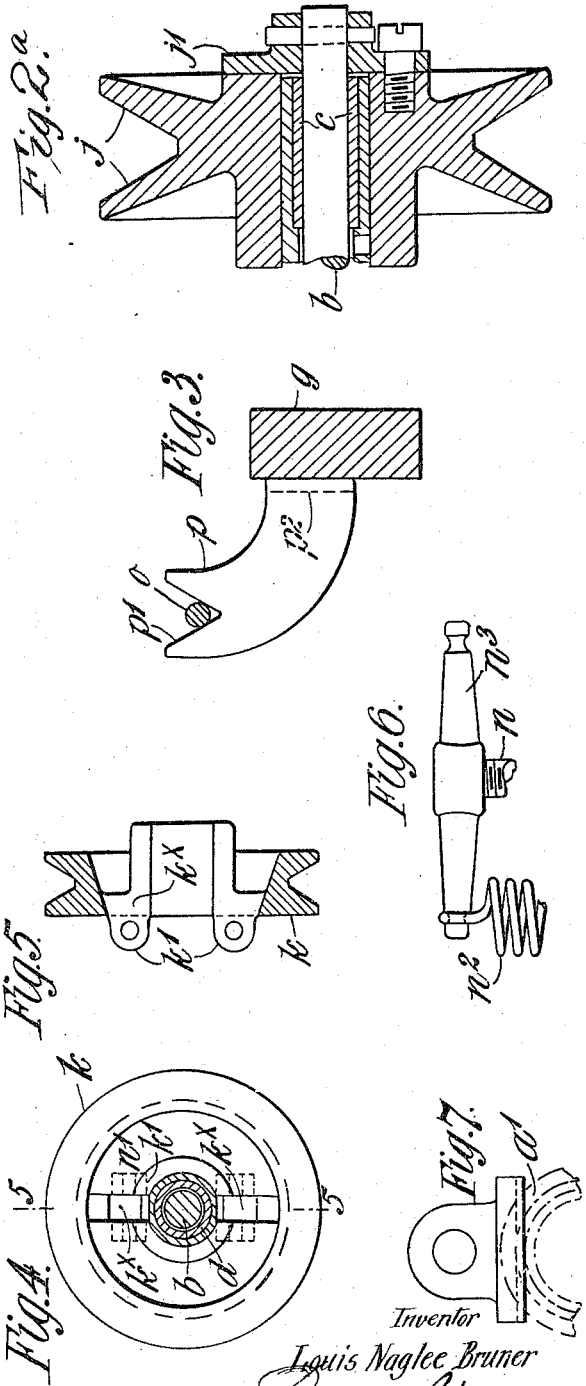
Witnesses
Inventor
Louis Naglee Bruner
by James L. Norris
Attorney

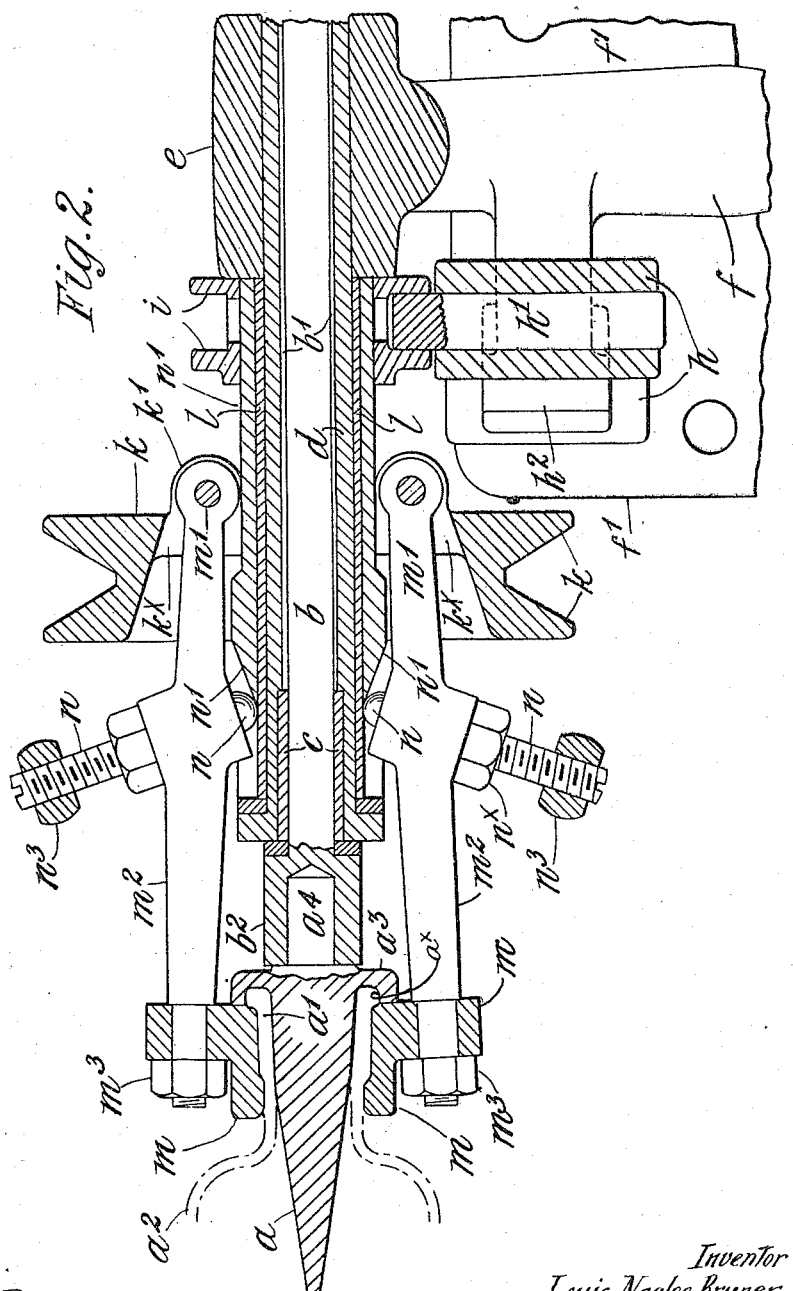

L. N. BRUNER.
APPARATUS FOR USE IN THE MANUFACTURE OF GLASS BOTTLES AND THE LIKE.
APPLICATION FILED SEPT. 6, 1913.
1,229,028.
Patented June 5, 1917.
4 SHEETS—SHEET 3.
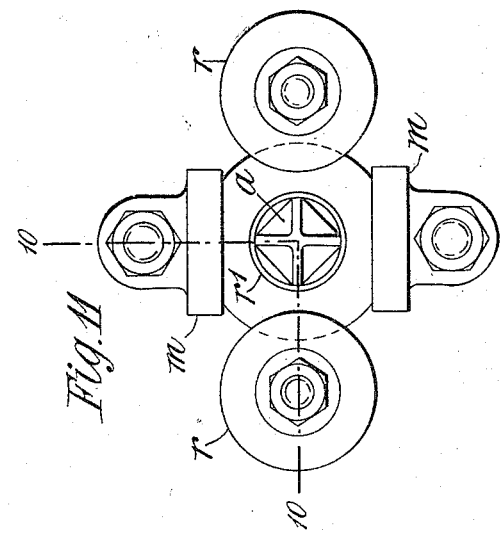
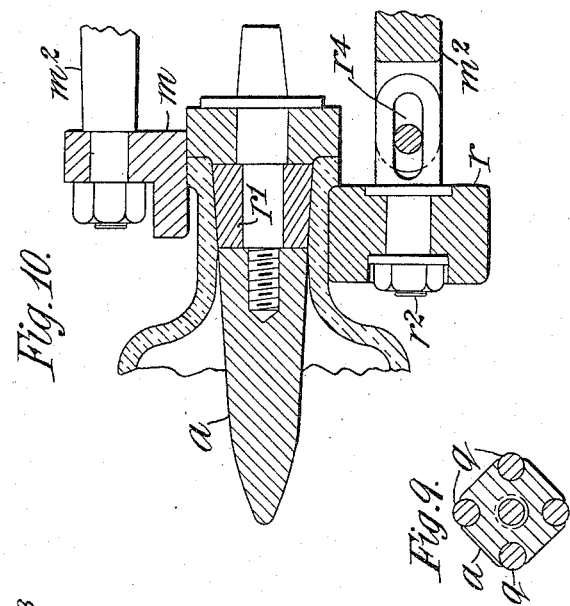
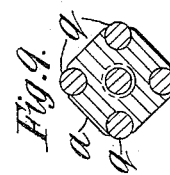
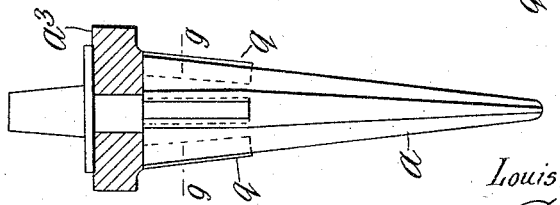
Witnesses
Inventor
Louis Naglee Bruner
by
Attorney.

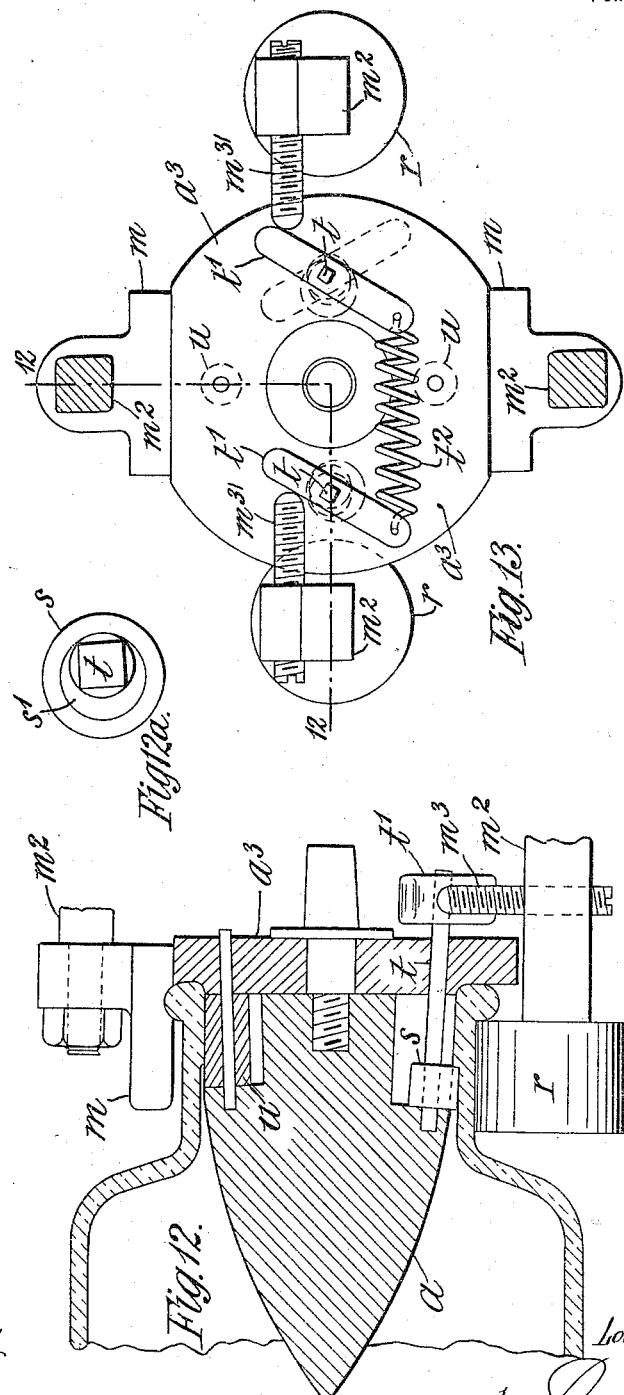

UNITED STATES PATENT OFFICE.

LOUIS NAGLEE BRUNER, OF ZURICH, SWITZERLAND.

APPARATUS FOR USE IN THE MANUFACTURE OF GLASS BOTTLES AND THE LIKE.

1,229,028.

Specification of Letters Patent.

Patented June 5, 1917.

Application filed September 6, 1913. Serial No. 788,456.

*To all whom it may concern:*

Be it known that I, LOUIS NAGLEE BRUNER, a citizen of the United States, residing at 7 Bellerivestrasse, Zurich, Switzerland, have invented certain new and useful Improvements in or Relating to Apparatus for Use in the Manufacture of Glass Bottles and the like, of which the following is a specification.

This invention has reference to apparatus for use in forming the mouths of glass bottles and the like and relates more particularly to apparatus of the kind or class in which outer dies or jaws, operated by conical or wedge-like sliding devices, are revolved around, and it may be in the opposite direction to, a central plug or plunger for forming the inner portion of the bottle mouth, while the latter is in a highly heated and softened condition.

One object of the invention is to insure a good shape for the upper portion or edge of the lip of the bottle and the exact concentricity of the inner and outer walls of such edge. To this end an annular flange, groove or channel, to form a mold for the lip, is provided around the base of the central piece, plug or plunger. The dies or jaws are made to have a good working fit with the front edge of the molding flange, or the groove or channel therein, to prevent the formation of any sharp ridge where the molded surface meets that formed by the pressure of the dies.

A further object of the invention is to provide a more effective arrangement and combination of parts, controlled by a hand lever whereby the workman can easily tell by the feel of the lever whether the dies are working properly and can adjust the pressure accordingly. This hand lever is mounted horizontally so that its weight does not interfere in any way with the adjustment of the pressure.

In addition to this the parts are arranged to project from the front of the bed or frame which supports them, toward the workman and in this way they are more accessible to the workman and can be more easily controlled, than if placed on top of the frame.

In order that the invention may be clearly understood and readily carried into effect reference will now be had to the accompanying drawings, in which:—

Figure 1 illustrates mainly in side elevation, the general arrangement of one example of the improved apparatus.

Fig. 2 is a vertical longitudinal central sectional view to a larger scale of the main piece or headstock comprising the principal revolving parts lying to the left of line 2—2 of Fig. 1.

Fig. 2$^a$ is a corresponding sectional view of the portion of the mechanism lying to the right of the line 2—2 of Fig. 1.

Fig. 3 is a detail section on the line 3—3 of Fig. 1, looking toward the left.

Figs. 4 and 5 are respectively a front view, and vertical section on the line 5—5, of a slotted pulley forming part of the headstock.

Fig. 6 illustrates a yoke and spring device hereinafter referred to.

Fig. 7 is a front view of one of the mouth-shaping dies or jaws hereinafter referred to.

Fig. 8 is a side elevation partly in section of the polygonal plug hereinafter referred to, Fig. 9 being in section thereof on line 9—9 of Fig. 8.

Fig. 10 is a fragmentary sectional view on the line 10—10 of Fig. 11 showing a modified construction of the jaws.

Fig. 11 is an end view of the modification shown in Fig. 10.

Fig. 12 is a fragmentary detail longitudinal section of another form of a modified plug device, being taken on the line 12—12 of Fig. 13.

Fig. 12$^a$ is a detail view of the mechanism shown in Fig. 12.

Fig. 13 is an end view of the construction shown in Fig. 12.

Referring more particularly to Figs. 1 and 2:—

$a$ is the taper plug for forming the interior of the mouth $a^1$ of the bottle $a^2$.

$a^x$ is the annular groove or channel (as above referred to) in a flange or lip mold $a^3$ around the base of the plug $a$, to insure a correct and uniform shape for the edge or lip of the bottle mouth $a^i$.

$b$ is the stem or spindle of the plug $a$, which is mounted in bushings or bearings $c$ one in each end of a fixed hollow or tubular spindle $d$, a suitable clearance or oilspace $b^1$ being left between it and the said fixed spindle $d$. The plug or former $a$ is detachably mounted on the stem $b$ by means of a center pin or spigot piece $a^4$ formed in one with the plug and fitting tightly in a recess or cavity in a head or socket piece $b^2$ at the end of the stem $b$. In this way different plugs or formers can be easily secured to the same stem according to the size and shape of the bottle mouth.

The spigot $a^4$ may however be clamped in the socket $b^2$, by a set screw.

The aforesaid fixed hollow spindle $d$ is in turn carried by the main bearing $e$ of the headstock, this bearing being carried by an arm $f$ or a bracket $f^1$ secured to the mainframe or bed $g$ of the machine.

With these parts is combined a handlever $h$ pivoted at $h^2$ and having a pin or stud $h^1$ engaging a grooved ring or collar $i$, suitable springs (not shown) being provided if desired for returning this handle to its original or normal position as in Fig. 1.

A grooved pulley $j$ is mounted to rotate on the right-hand end of the spindle $d$, being for this purpose made fast to a disk $j^1$ keyed to the rear end of the stem $b$.

A second grooved pulley $k$ viz. the slotted pulley shown in Figs. 4 and 5 is mounted near the base of the plug $a$ and is made fast to a sleeve $l$ which can rotate freely around the hollow spindle $d$, and on which sleeve the aforesaid collar $i$ can slide to-and-fro, while however revolving therewith.

The latter pulley $k$ has a diametrical slot $k^x$ and a set of lugs or brackets $k^1$ supporting the pivots $m^1$ of a pair of levers $m^2$ which extend through the slot and carry the self-closing dies or jaws $m$ for shaping the outside of the bottle mouth, these dies being fixed by clamping nuts $m^3$.

Each lever $m^2$ also carries an adjusting screw-bolt or pin $n$ adapted to be acted on by the corresponding one of a pair of tapered slides or wedges $n^1$ connected with the grooved collar $i$ and extending through the slot $k^x$ of the disk $k$.

When therefore the wedges $n^1$ are moved toward the left (by the collar $i$ and the handle $h$) they act on the ends of the screws $n$ and thus press the levers $m^2$ and jaws $m$ laterally outward against the pull of one or more springs $n^2$ (hereinafter referred to) which are stretched between the jaws and thus give an exactly equal pressure to each.

The action of the wedges however takes place without interfering with their revolving motion, since the levers $m^2$ and wedges $n^1$ are carried around freely in the grooved pulley $k$. The wedges $n^1$ are not shown in Fig. 1, a plain conical surface being indicated between the levers for the sake of clearness.

It will be seen that it is important that both of the jaws or dies $m$ should in their closed position be exactly equidistant from and concentric with the plug $a$, and this can be readily brought about by so adjusting the set screws $n$ that when they abut against the sleeve $l$, the said dies are in the exact relative position desired, and the adjusting screws can be locked by nuts $n^x$.

The pulleys $j$ and $k$ in this example are arranged to rotate in opposite directions, thus causing the plug $a$ (driven by pulley $j$) to rotate in the opposite direction to the jaws or dies $m$ (driven by the slotted pulley $k$). For example both may be driven from the same shaft or motor, but one may have its belt crossed to reverse the direction of rotation. The purpose of this opposite driving is partly to avoid any twisting of the highly heated and soft glass of the bottle neck, such as might occur in some cases if the parts $a$ and $m$ rotated in the same direction, and also to relieve the strain on the operator who is holding the stem $o$ of the bottle gage or holder $o^1$. In the present example the movements of the plug $a$ and dies $m$, being in opposite directions, tend to neutralize each other and thus avoid drag or twist on the bottle mouth, and also any tendency to rotate the bottle itself.

The supporting arrangement for the said stem or handle $o$ of the bottle gage or holder $o^1$ comprises a pair of arms or brackets $p$ (Figs. 1 and 3) which are sufficiently far apart to form rests for the said stem, and are each provided with a V-shaped recess or notch $p^1$, in which the said stem is laid. These notches $p^1$ are so situated that when the gage stem is laid in them they form a self-centering arrangement.

In other words the inclination of the sides of the recesses $p^1$ and the height of the said recesses as well as the diameter of the stem $a$ are so adjusted that the axis of the stem $c$ and gage $o^1$ is brought exactly into line with that of the tapered plug.

The bearing or bearings ($e$) which support the spindle of the latter may be fixed on the same bed or frame work $g$ which carries the said recessed arms or brackets $p$, and these arms are conveniently secured to, or formed by bending the ends of, a rigid strip or bar $p^2$ of iron bolted to the frame $g$ by suitable bolts such as $p^3$.

From the foregoing description it will be seen that all the main parts thus project in front of the frame $g$ and are more conveniently accessible to the operator than if placed on the top thereof, although the invention is not limited to this feature.

With this arrangement, all the operator has to do is to keep the stem $o$ of the gage $o^1$ firmly pressed down into the notches $p^1$, and move it endwise when he desires to cause the bottle mouth to pass on to the plug $a$ and this movement continues until the lip of the bottle mouth fills the groove $a^x$; the jaws $m$ having been first opened by means of the wedges $n^1$ operated by the handle $h$.

As soon as the bottle neck $a^1$ is properly in position on the plug $a$, the handle $h$ is moved back (or released if it is self-acting) and the jaws $m$ are brought together automatically by the springs $n^2$ stretched between a pair of adjustable cross pieces or yokes $n^3$ (Fig. 6) on the screw-bolts $n$. Owing to the fact that the handle is horizontal the operator can easily judge as to the pressure of the jaws on the glass, and can thus regulate the working with great nicety, since the weight of the handle does not disturb the pressure at all.

The jaws are of such a section that their inner surfaces correspond to the shape of the bottle mouth and to the thickness thereof at different distances from the lip, and they shut against and match with the lip mold $a^3$, so that as they revolve they impart the desired shape, smoothness and finish to the exterior of the bottle mouth, the said jaws or dies pressing more or less tangentially on the glass. At the same time the plug $a$, revolving in the opposite direction to and exactly concentric with, the jaws $m$, shapes the interior of the bottle mouth.

After this the jaws are again opened by the handle $h$ and wedges $n^1$, and the bottle is drawn back off the plug $a$ and removed from the bottle gage, into which the next bottle is immediately inserted, and passed on to the said plug, and so on.

It will be readily understood that the apparatus might be so constructed that the plug $a$ would act as a plunger and be thrust endwise into the bottle mouth after the bottle had been placed in position. In such a case the jaws or dies could be so arranged that they revolve in the same direction as the plug. It is preferred however to adopt the general arrangement illustrated in the drawings.

The construction of the plug $a$ may be modified in various ways, as shown, for instance in Fig. 8 in side view, and in Fig. 9, in cross section on the line 9—9 of Fig. 8. In this case the plug $a$ is made approximately polygonal in section and cylindrical pins $q$ are fitted into it so as to project slightly above the corners (see Fig. 9). These pins thus form the working surfaces which act on the glass, and can be renewed as required without having to renew the whole plug. The said pins may be of hardened steel, or other suitable metal.

In the modification shown in section in Fig. 10 and in end view in Fig. 11, the jaws $m$ are combined with a pair of rollers $r$ at right angles to them. The plug $a$ has a loose ring or collar $r^1$ fitted around it near the base. This ring remains stationary as the jaws $m$ and rollers $r$ revolve outside the bottle neck and in this way there is less twisting strain on the glass, than if it were revolving in the opposite direction to them. The rollers $r$ are carried by levers $m^2$ operated in the same way as the levers which carry the jaws $m$, by wedges $n^1$ as in Fig. 2. The jaws $m$ shape the outside of the bottle lip, while the rollers fit in behind the lip and shape the bottle neck, spreading the glass to an even thickness all around. The pivot pin $r^2$ of the roller is connected with the lever arm $m^3$ by an adjustable joint, such as $r^4$ to enable the roller to be moved sidewise, according to the depth of the bottle lip. The plug $a$ itself in this case is made square with rounded corners, to act more easily when inserted in the interior of the bottle mouth. The wedges ($n^1$ Fig. 2) which control the movement of the rollers $r$, are arranged to act a little later than those which control the jaws $m$, so that after the jaws have formed the lip, the rollers then operate and smooth out the heated glass around the bottle neck.

In order to permit of forming a ridge inside the bottle neck, a roller $s$ is mounted on an eccentric $s^1$ (see detail view Fig. 12$^a$) carried by a spindle $t$ fitted in the base of the plug $a$ and the lip mold or flange plate $a^3$. On the end of each spindle $t$ is a lever arm $t^1$, these levers being connected by a spring $t^2$. The action of the spring is to make the eccentrics draw the rollers back into the recess so that they shall not project from the plug until required to form the internal ridge.

Carried by the levers $m^2$ of the rollers $r$, are set screws $m^{31}$ abutting against the arms $t^1$. When therefore the outer rollers $r$ are pressed inward toward the bottle mouth (see left hand side of Fig. 13) the set-screw $m^{31}$ moves the arm $t^1$ and turns the spindle $t$ so that the eccentric causes the inner roller $s$ to move outward and press into or indent the soft inner surface of the bottle mouth (see Fig. 12) and form an internal ridge or shoulder therein as required. The roller $r$ on the right of Fig. 13 would be pressed inward at the same time, and would put its lever $t^1$ into the dotted position. For the sake of clearness, it is shown in the retired position where it is lifted off the glass. In addition to this, other rollers $u$ are mounted in the plug $a$ near the base thereof, to assist in forming the inner surface of the bottle mouth.

What I claim as my invention and desire to secure by Letters Patent of the United States is:—

1. In an apparatus for use in the manufacture of glass bottles and the like, the combination of a central plug for shaping the interior of the bottle mouth, dies or jaws revolving around same, a lip mold formed around the base of said central plug, wedges for moving said jaws outwardly, adjustable stops mounted on said jaws and on which said wedges act, and springs for drawing said jaws inwardly, substantially as described.

2. In an apparatus for use in the manufacture of glass bottles and the like, the combination of a revolving central plug with a lip mold around the base thereof, revolving dies or jaws revolving oppositely to the plug for forming the exterior of the mouth and fitting close up to the lip mold, springs stretched directly between said jaws for drawing the latter inward toward the plug with an equal pressure, sliding wedges for controlling the movement of the jaws inwardly and outwardly, substantially as described.

3. In an apparatus for use in the manufacture of glass bottles and the like, the combination of a central revolving plug and oppositely revolving jaws whereby the bottle mouths are shaped, means for adjusting the jaws independently and laterally of each other, spring means for causing the jaws to give an equal inward pressure, a headstock carrying said jaws and mounted at the front end of the apparatus, supports or rests for the stem of the bottle-holder also mounted at the front of the bed or frame of the apparatus, and means for manually controlling said jaws, substantially as described.

4. In an apparatus for use in the manufacture of glass bottles and the like, the combination of a central plug for shaping the interior of the bottle mouth, a revolving spindle carrying said plug at one end thereof, step-like jaws for forming the exterior of the bottle mouth, means for rotating said jaws and central plug simultaneously in opposite directions, springs stretched directly between said jaws for moving them together with an equal pressure on each, means for adjusting said springs, and wedges for moving said jaws apart, substantially as described.

5. In an apparatus for use in the manufacture of glass bottles and the like, the combination of a central plug for shaping the interior of the bottle mouth, a pair of jaws for forming the exterior of the bottle mouth, a central rotary spindle carrying said plug at one end and connected to a driving pulley at the other, a fixed hollow spindle mounted in a bearing and surrounding said central spindle, a rotary sleeve surrounding said spindle and carrying said jaws, means for driving said central spindle and sleeve, and wedges for moving said jaws apart, substantially as described.

In testimony whereof I affix my signature in presence of two witnesses.

LOUIS NAGLEE BRUNER.

Witnesses:
THOMAS B. KITSON,
JOHN WM. HAIGH.

Copies of this patent may be obtained for five cents each, by addressing the "Commissioner of Patents, Washington, D. C."